United States Patent
Wallin et al.

(10) Patent No.: US 11,161,294 B2
(45) Date of Patent: Nov. 2, 2021

(54) METHOD AND APPARATUS FOR INTRODUCING A FOIL INTO AN ELONGATED DUCT AND APPARATUS AND METHOD FOR LAMINATING A FOIL TO A DUCT

(71) Applicant: CLIMATE RECOVERY IND AB, Kalmar (SE)

(72) Inventors: Peter Wallin, Kalmar (SE); Göran Bernhardsson, Stockholm (SE)

(73) Assignee: CLIMATE RECOVERY IND AB, Kalmar (SE)

( * ) Notice: Subject to any disclaimer, the term of this patent is extended or adjusted under 35 U.S.C. 154(b) by 1093 days.

(21) Appl. No.: 15/555,524

(22) PCT Filed: Mar. 4, 2016

(86) PCT No.: PCT/SE2016/050173
§ 371 (c)(1),
(2) Date: Sep. 4, 2017

(87) PCT Pub. No.: WO2016/144238
PCT Pub. Date: Sep. 15, 2016

(65) Prior Publication Data
US 2018/0050485 A1 Feb. 22, 2018

(30) Foreign Application Priority Data

Mar. 6, 2015 (SE) .................................... 1550279-2
Mar. 6, 2015 (SE) .................................... 1550280-0

(51) Int. Cl.
*F16L 55/163* (2006.01)
*B29C 63/00* (2006.01)
(Continued)

(52) U.S. Cl.
CPC ........ *B29C 63/0069* (2013.01); *B29C 63/341* (2013.01); *F16L 11/02* (2013.01);
(Continued)

(58) Field of Classification Search
CPC ....... F16L 55/16; F16L 55/163; F16L 55/162; F16L 55/165; F16L 55/1653; F16L 55/1654; F16L 55/1645
(Continued)

(56) References Cited

U.S. PATENT DOCUMENTS 4,394,202 A * 7/1983 Thomas .............. F16L 55/1652
                                                      138/97
4,438,056 A   3/1984 Bast
(Continued)

FOREIGN PATENT DOCUMENTS

DE          3732694 A1    4/1989
DE     102007050344 A1    4/2009
(Continued)

OTHER PUBLICATIONS

International Search Report (dated Jun. 22, 2016) for corresponding International App. PCT/SE2016/050173.
(Continued)

*Primary Examiner* — Patrick F Brinson
(74) *Attorney, Agent, or Firm* — WRB-IP LLP

(57) ABSTRACT

An apparatus (1) and method for introducing a foil (10) to be laminated to an inner surface (15) of an elongated duct (6), wherein the foil is providable on an axle (2), the axle being movable from a first position outside of the duct, where the foil is provided on the axle, to a second position inside the duct where the foil is in position for lamination to the inner surface of the duct.

33 Claims, 5 Drawing Sheets

(51) Int. Cl.
*B29C 63/34* (2006.01)
*F16L 57/04* (2006.01)
*F16L 11/02* (2006.01)
*F24F 13/02* (2006.01)
*F16L 55/1645* (2006.01)
*B29L 23/00* (2006.01)

(52) U.S. Cl.
CPC .......... *F16L 57/04* (2013.01); *F24F 13/0245* (2013.01); *F24F 13/0281* (2013.01); *B29L 2023/22* (2013.01); *F16L 55/163* (2013.01); *F16L 55/1645* (2013.01)

(58) Field of Classification Search
USPC ...................................... 138/97, 98; 156/256
See application file for complete search history.

(56) References Cited

U.S. PATENT DOCUMENTS

| | | | |
|---|---|---|---|
| 4,950,446 A | 8/1990 | Kinumoto et al. | |
| 5,346,658 A | 9/1994 | Gargiulo | |
| 5,725,026 A * | 3/1998 | Maimets | F16L 55/163 138/97 |
| 6,228,312 B1 | 5/2001 | Boyce | |
| 7,077,196 B2 * | 7/2006 | Rudd | E21B 43/086 166/207 |
| 7,861,744 B2 * | 1/2011 | Fly | F16L 55/1654 138/98 |
| 10,359,143 B2 * | 7/2019 | Parker | B32B 7/12 |
| 2012/0145271 A1 * | 6/2012 | McKeller | F16L 55/1656 138/98 |

FOREIGN PATENT DOCUMENTS

| | | |
|---|---|---|
| GB | 2406889 A1 | 4/2005 |
| JP | 2013006405 A | 1/2013 |
| WO | 9005267 A1 | 5/1990 |

OTHER PUBLICATIONS

JP 2003001707 A (Hakko Co), Jan. 8, 2003 (Jan. 8, 2003); WPI abstract.
JP 03175018 A (Osaka Bosui Kensetsusha KK), Jul. 30, 1991 (Jul. 30, 1991); WPI abstract.
JP 63162221 A (Osaka Gas Co Ltd), Jul. 5, 1988 (Jul. 5, 1988); WPI abstract.
JP 6334121 A (Chukoh Chem Ind et al), Feb. 13, 1988 (Feb. 13, 1988); WPI abstract.
European Search Report (dated Feb. 20, 2018) for corresponding European App. EP 16 76 2058.

* cited by examiner

METHOD AND APPARATUS FOR INTRODUCING A FOIL INTO AN ELONGATED DUCT AND APPARATUS AND METHOD FOR LAMINATING A FOIL TO A DUCT

FIELD OF TECHNOLOGY

The present invention concerns how to introduce a foil for lamination into an elongated duct, preferably for ducts made of glass or stone fibres and especially for ventilation ducts, and how to laminate a foil.

BACKGROUND

In order to provide sealed and fire proof ducts, especially when made of fibres, it is required to laminate the ducts on the outside and on the inside. To laminate on the outside a conventional method may be used, such as rotating a duct having a foil provided around the periphery over a hot table.

Foils to be used generally comprises at least a layer of metal, such as aluminium, and a thermoplastic polymer layer for heat adhering to the surface of the duct.

It is difficult to arrange a foil inside an inner space of an elongated duct, the ducts may be several meters long. The risk of ripping and crinkling the foil is obvious. Both leading to insufficient lamination of the duct.

SUMMARY OF THE INVENTION

The aim of the present invention is to provide an effective way of introducing foil into elongated ducts limiting the risks of ripping and crinkling and increasing the possibilities of high quality lamination. The aim of the present invention is also to laminate elongated ducts in a cost and time efficient way and at the same time provide ducts having a high quality lamination, which is well fitted and adhered and thus fulfil desired fire proof requirements.

According to a first aspect of the present invention an apparatus is provided. The apparatus comprises an axle and the foil is providable on the axle, the axle being movable from a first position outside of the duct, where the foil is provided on the axle, to a second position inside the duct where the foil is in position for lamination to the inner surface of the duct. Preferably, the ducts are made of glass or stone fibres and especially suitable for ventilation ducts.

According to one embodiment the axle is provided with means for spreading out the foil against the inner surface of the duct. This increases the quality of the following lamination.

According to another embodiment the axle comprises means for regulating a gas, both under pressure and over pressure, and having orifices connected to the regulation means at a surface of the axle. Preferably, the means for regulating a gas is set to provide an under pressure along the axle in order to keep the foil in position during the movement of the axle from the first to the second position. In this way the foil is securely fixed at the axle during the movement of the axle into the inner space of the elongated duct decreasing the risk of ripping and crinkling.

According to a further embodiment the means for spreading out the foil is using the means for regulating a gas to provide an over pressure along the axle in order to spread out the foil in position for lamination when the axle is in the second position. This function may be used on its own or combined with the mechanical feature described below.

According to one embodiment the means for spreading out the foil comprises a mechanism for increasing the circumference of the axle. This feature may be used on its own or combined with the function described above concerning over pressure.

Preferably, the axle has a cross sectional shape which corresponds to the cross sectional shape of the inside of the inner space of the duct. Also this increases the quality of the following lamination.

According to one embodiment the foil which is arrangeable at the axle is in the form of a tube.

According to another embodiment the foil arrangeable at the axle is in the form of a sheet, preferably rolled off a supply roll.

According to a further embodiment the axle is provided with at least a gripper provided at each end or along the length of the axle, parallel to the axle, in which gripper an end of the foil is gripped. Preferably, the axle is rotatable around its length axis, thus rolling up foil around the periphery of axle.

According to another embodiment a brush is arranged along the length of the axle, the brush being movable towards against the periphery of the axle during the rolling up of foil on the axle.

According to one embodiment a cutter is movable from one end of the axle to the other end cutting the foil parallel to the length axis, thus detaching a piece of foil rolled up on the axle from a supply roll.

According to a further embodiment heat laminating means is/are provided at least in the end of the axle which is first introduced into the inner space of the duct. It is also possible that the heat laminating means are arranged along the full length of the axle.

According to one embodiment the axle is movable out of the inner space of the duct and at the same time the heat laminating means are active, thus laminating the foil against the inner surface of the inner space of the duct, during the withdrawal of the axle. It is conceivable that the heat laminating means uses hot gas at over pressure or are contact heating pads.

According to a second aspect of the present invention a method is provided for introducing a foil to be laminated to an inner surface of an elongated duct, comprising the steps:
arranging a foil to an axle when the axle is in a first position outside of the duct,
introducing the axle and the foil into the inner space of the duct by moving the axle into a second position inside the duct, where the foil is in position for lamination to the inner surface of the duct.

According to an embodiment of the method it comprises the step of spreading out the foil along the inner surface of the duct so that the foil is in contact with the inner surface.

According to an embodiment of the method it comprises the step of sucking the foil to the axle by means of under pressure during the step of introducing the axle into the inner space of the duct.

According to an embodiment of the method it comprises the step of gripping an end of the foil with at least a gripper provided at each end or lengthwise at the axle, unrolling foil from a supply roll, rolling up the foil on the axle, by rotating the axle, and cutting off the rolled up foil from the supply roll.

According to an embodiment of the method it comprises the step of laminating the foil to the inner surface of the duct by means of heat.

According to an embodiment of the method it comprises the step of heat laminating during the step of withdrawing the axle from the inner space of the duct.

According to a third aspect of the invention an apparatus for laminating a foil to an inner surface of an elongated duct is provided. The apparatus comprises an axle provided with at least one heat laminating means, the at least one heat laminating means is provided in the vicinity of a first end of the axle.

The axle is being movable from a first position outside of a first end of the duct through an inner space of the duct to an end position where at least a portion of the axle, the portion having the heat laminating means, is outside of a second end of the duct. The first end of the axle is the end that enters the inner space of the duct during the movement.

Preferably, the ducts are made of glass or stone fibres and especially suitable for ventilation ducts. Preferably the foil is positioned in the inner space along the inner surface of the duct ready for lamination.

According to an embodiment the heat laminating means is provided for exhausting hot gas against an inner side of the foil so that an outer side the foil will at least partly melt and adhere to the inner surface of the duct.

According to another embodiment the heat laminating means are at least two heating blocks provided for sliding contact along an inner side of the foil so that the foil will partly melt and adhere to the inner surface of the duct.

According to an embodiment a shape of an outer surface of the heating blocks corresponds to a shape of the inner surface of the duct. This increases the quality of the lamination.

According to one embodiment the heating blocks are arranged in at least two axial places along the axle, thus the at least one heating block of the second place will follow the at least one heating block of the first place during movement of the axle through the inner space of the duct.

According to a further embodiment the heating blocks are positionable in at least a closed position close to the axle and a working position on a radial distance from the axle. Preferably, at least some of the heating blocks are positionable in an intermediate position during the initial lamination.

According to an embodiment the heating blocks are kept in the closed position by means of at least one retaining spring.

According to an embodiment the heating blocks are movable to at least the working position by means of climbing towards the broad end on at least one wedge or conical device. Preferably, the at least one wedge or conical device is arranged on a respective rod, which is axially movable inside the axle. Each axial place for heating blocks has preferably a wedge or conical device and a corresponding rod.

According to an embodiment heating blocks corresponding to corners of the cross sectional shape of the inner space of the duct, such as hexagonal, are arranged at the first axial place.

According to a fourth aspect of the present invention a method for laminating a foil to an inner surface of an elongated duct is provided. The method comprises the steps of introducing an axle having heat laminating means at a first, a leading, end of the axle at a first end of the duct into an inner space of the duct, heat laminating along the inner space of the duct while the axle moves axially through the inner space of the duct until at least a portion of the axle having the heat laminating means protrudes outside of the inner space at a second end of the duct, and withdrawing the axle through the laminated inner space of the duct to the outside of the first end of the duct.

Preferably the method comprises the step of raising the heat laminating means in the form of at least two heating blocks radially so that they will come in contact with the foil arranged along the inner surface of the duct during the movement of the axle from the first end to the second end of duct.

DESCRIPTION OF THE DRAWINGS

The present invention will now be described in more detail under referral to the attached drawings, in which.

DETAILED DESCRIPTION OF EMBODIMENTS

Different embodiments of the present invention will now be described in detail. Different features described may be combined in any way and not only in accordance with the exemplifying embodiments described.

Figure 1:
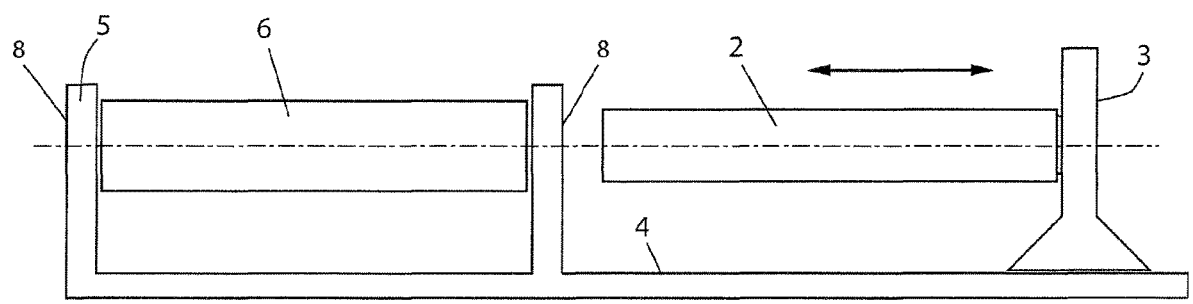
FIG. 1 shows an apparatus according to the invention in a general view.

In FIG. 1 a general view of an embodiment of the apparatus is shown from the side. The apparatus 1 has an axle 2, the axle 2 being movable back and forth in its axial direction, see the double arrow. This may be accomplished by having a support 3 that may slide along a foundation 4, for example.

In front of the axle 2 a cradle 5 is arranged for holding an elongated duct 6 to be provided with a foil 10 at its inner space 7. The cradle 5 preferably has a stopper 8 in each end for keeping the duct 6 in position during the introduction of the foil 10. The duct 6 is kept in line with a length axis of the axle 2. It is also conceivable to arrange the apparatus in a vertical direction, too.

Figure 2A:
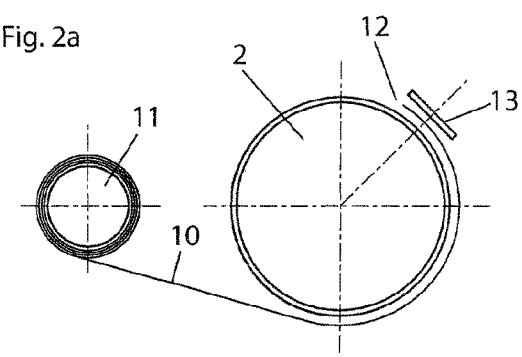
FIGS. 2a and 2b shows an embodiment in a cross sectional view when foil is rolled up on an axle and possibility to regulate gas through orifices in the axle.

There are different ways to arrange the foil 10 on the axle 2. One way may be to have the foil 10 in tube form and pull it over the axle 2 into position (not shown). Another way is to roll up a piece of foil 10 for example from a supply roll 11, see FIG. 2*a*.

An end portion 12 of the foil 10 is rolled off from the supply roll 11 and positioned in the vicinity of the axle 2, for example on a table movable in under the axle 2. The axle 2 may be lowered or the table raised so that at least a gripper 13 may grip the end portion 12 of the foil 10. Preferably there is a gripper 13 in each end of the axle 2. It is also conceivable to have grippers 13 along the length of the axle 2.

In one embodiment the gripper 13 at each end grip the end portion 12 and hold it while the axle 2 and the table distances from each other and the axle 2 starts rotating thus rolling up the foil 10 onto the axle 2. Preferably a brush (not shown) brushes along the length of the axle 2 in order to roll the foil 10 up tightly around the axle 2.

The foil 10 is cut off by means of a cutter (not shown) along the length of the axle 2, parallel to the length axis of the axle 2. Preferably a foil holder is put against the foil 10 provided on the table in order to keep the foil 10 in position during the cutting operation. When the piece of foil 10 is cut off the brush holds the last portion of the foil 10 while the grippers 13 take a new grip at also the overlapping last portion of the foil.

Figure 2B:
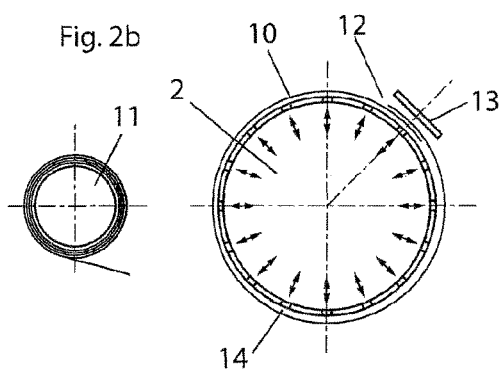

In one embodiment the axle 2 is provided with means for regulating a gas. The axle 2 is then provided with orifices 14 at the periphery of the axle 2, see FIG. 2*b*. The orifices 14 are connected via conduits to the gas regulating means.

According to one embodiment the gas regulating means can provide under pressure so that a sucking force is provided at the orifices 14 spread out over the periphery of the axle 2. Thus the foil 10 arranged around the axle 2 may be sucked against the axle 2 in order to affix the foil 10 more securely.

When the foil 10 is arranged at the axle 2, either in tube form or piece form, the axle 2 moves along its length axis towards and into the inner space 7 of the duct 6 until the foil 10 is in a corresponding position where an inner surface 15 of the inner space may be covered by the foil 10. At least the grippers 13 keep the foil 10 in position on the axle 2 but preferably also under pressure from the gas regulating means.

Figure 4A:
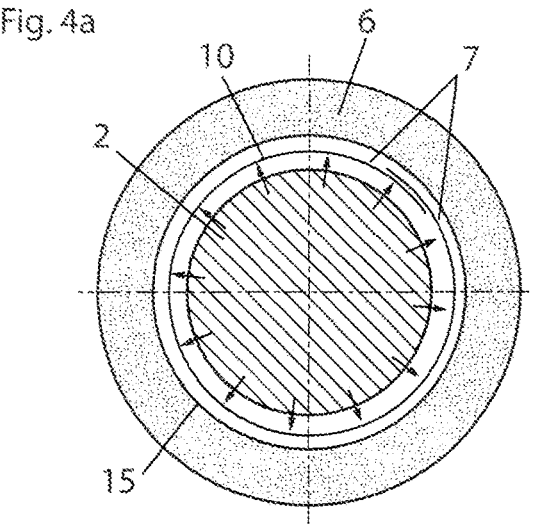
FIGS. 4a and 4b shows another embodiment in a cross sectional view the duct, foil and the axle when spreading out the foil against an inner surface of the duct.
Figure 4B:
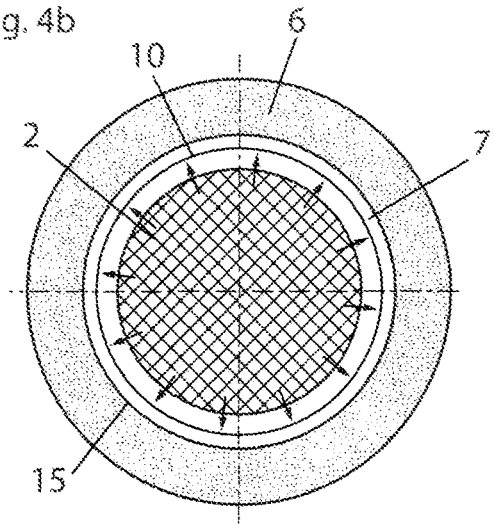

According to an embodiment, means for spreading out the foil 10 against the inner surface 15 of the duct is provided. This means for spreading out the foil can be a gas, such as air, blowing out from the orifices 14, see arrows in FIGS. 4*a* and 4*b*, by means of a gas regulating means providing over pressure. This embodiment is suitable when the cross sectional shape of the inner space 7 for example is circular. In FIG. 4*a* the foil 10 is shown made up of a piece and in FIG. 4*b* the foil 10 is in tube form.

Figure 3:
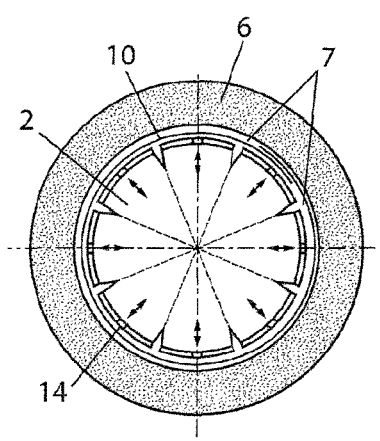
FIG. 3 shows an embodiment in a cross sectional view of the duct, foil and the axle when spreading out the foil against an inner surface of the duct.

According to another embodiment means for spreading out the foil 10 against the inner surface 15 of the duct are mechanical means arranged so that an increase of the periphery of the axle 2 may be achieved which will spread out the foil 10 against the inner sides 15 of the duct. See FIGS. 3 and 5. This embodiment is suitable for example for cross sectional shapes of the inner space 7 having corners, such as a hexagonal shape.

Figure 5:
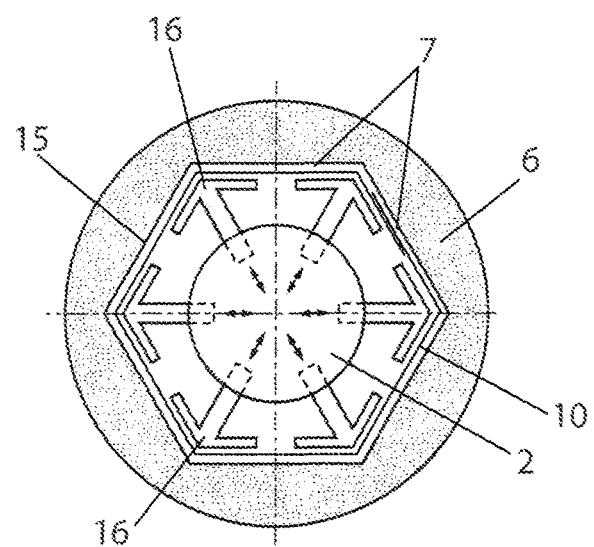
FIG. 5 shows a further embodiment in a cross sectional view the duct, foil and the axle when spreading out the foil against an inner surface of the duct.
Figure 6:
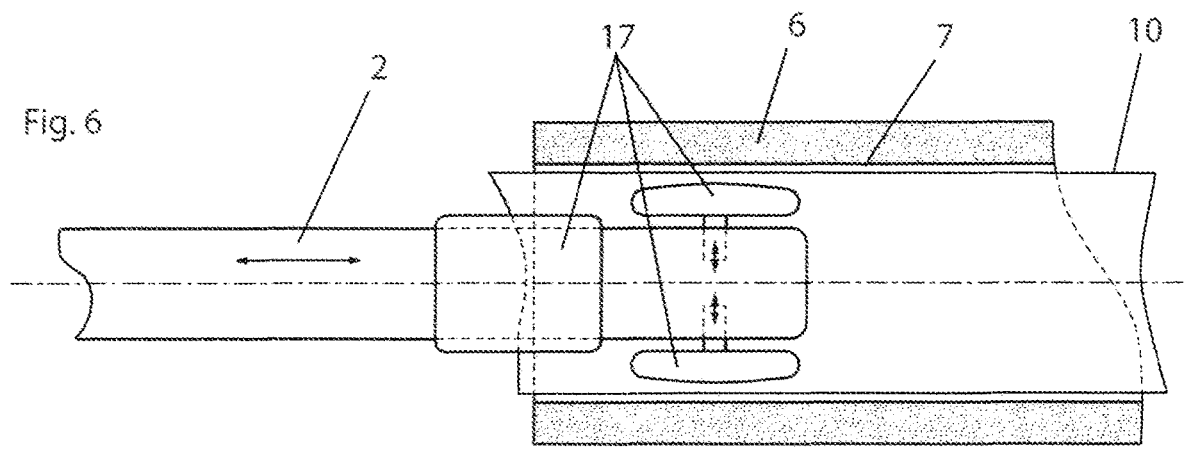
FIG. 6 shows heat laminating means at the end of the axle which is first introduced into the inner space of the duct.

An example of an axle 2 having hexagonal shape is shown in FIG. 5. Corner parts 16 are movable in radial direction, as shown with the arrows in FIG. 5. When having corners in the inner space 7 it is preferred to make sure the foil 10 is spread into the corners to adhere also there. When having corner parts 16 a more secure spreading out is provided.

When the axle 2 with arranged foil 10, either in tube form or piece form, is positioned inside the inner space 7 of the duct 6, the step of spreading out the foil 10 along the inner surface 15 of the duct 6 so that the foil 10 is in contact with the inner surface 15 is started. Now the foil 10 is in position ready for heat lamination.

According to one embodiment it is also preferred to add over pressure from a gas regulating means to the mechanical spreading out means. This builds up a thin cushion of gas, preferably air, between the foil 10 and the axle 2. Thus the friction goes down to a minimum during the step of withdrawing the axle 2. It is also possible to radially withdraw the mechanical spreading out means a very short distance to make room for the cushion of gas. For example the distance may be 1 mm.

When the foil 10, in tube form or piece form, is in position for lamination the axle 2 withdraws out from the inner space 7 of the duct 6. At the same time the lamination step start. This may be performed with a separate apparatus introduced from the end of the duct 6 furthest from the axle 2 and its support 3. But it is also conceivable to arrange heat laminating means in the present apparatus.

According to one embodiment heat laminating means 17 is/are arranged at least at the end of the axle 2 which is the first introduced into the inner space 7. It is also conceivable to have heat laminating means along the full length and periphery of the axle 2.

When the axle 2 is moving out of the inner space of the duct and the heat laminating means are active at the same time, a lamination of the foil 10 against the inner surface 15 of the inner space 7 of the duct 6 will occur, during the withdrawal of the axle 2. It is also conceivable to heat laminate the foil 10 along the full length of the duct 6 if heat laminating means 17 are present along the full length of the axle 2 while the axle 2 is still present inside of the duct 6.

The heat laminating means 17 may be contact heating pads 17 or hot gas provided at over pressure or a mix of both. It is conceivable to use the gas regulating means and connected orifices 14 along the full length of the axle 2 in order to laminate while the axle 2 is standing still inside of the duct 6.

If contact heating pads 17 are used they are preferably arranged at the end furthest away from the support 3 and brought in contact with the foil 10 pressing against the inner surface of the duct 6 while the axle 2 is withdrawn thus heat laminating the foil 10 against the inner surface 15 of the duct 6.

Preferably, the feature of blowing gas through the orifices 14 in order to provide a gas cushion is used at the same time as the contact heating pads 17 are used and it is also conceivable to use hot air for the gas cushion, which will pre melt the thermoplastic polymer layer of the foil 10.

Different embodiments of the present invention will now be described in detail. Different features described may be combined in any way and not only in accordance with the exemplifying embodiments described.

Figure 7:
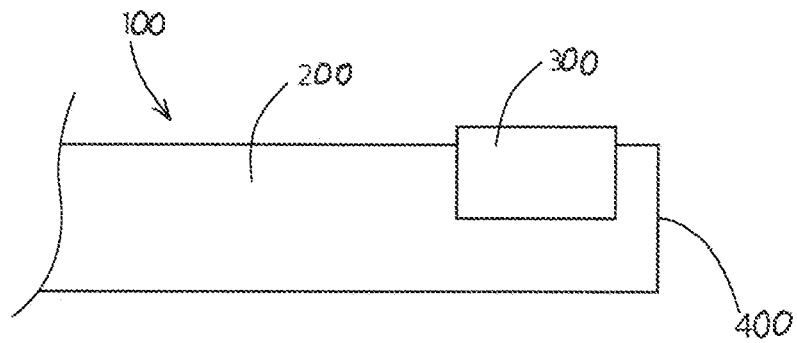
FIG. 7 shows a general embodiment of the inventive apparatus in a side view.

In FIG. 7 an embodiment of the inventive apparatus is shown. The apparatus 100 comprises an axle 200 having at least one heat laminating means 300 provided in the vicinity of a first end 400 of the axle 200. The axle 200 is elongated and as long as it will be able to protrude out, at least a portion of the axle, the portion having the heat laminating means, of a second end of a duct 6 to be laminated.

The first end of the duct 6 is where the axle 200 enters an inner space 7 of the duct 6. The axle 200 being movable from a first position outside of the first end of the duct 6 through the inner space 7 of the duct 6 to an end position where at least a portion of the axle, the portion having the heat laminating means, is outside of the second end of the duct 6.

Figure 8:
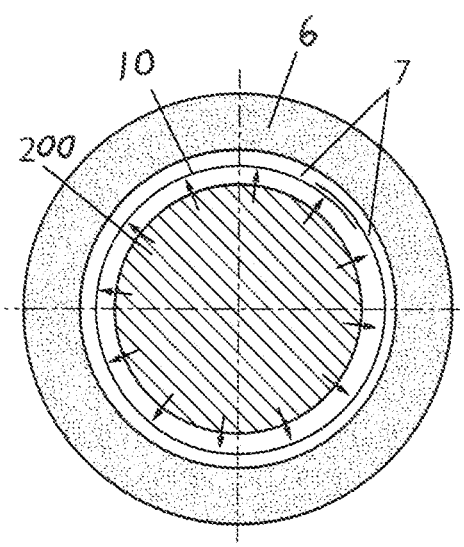
FIG. 8 shows a cross sectional view of an embodiment using hot gas for heat lamination.

In FIG. 8 a duct 6 is seen in cross section showing a foil 10 arranged inside the inner space 7 of the duct 6 ready for lamination. The lamination is carried out by means of heat and the foil 10 is preferably a foil 10 comprising at least one layer of metal, such as aluminium, and one layer of thermoplastic polymer which can be melted in order to adhere to an inner surface of the duct 6.

In the embodiment of FIG. 8 the heat laminating means 300 provides heat by blowing hot gas, preferably air, against the foil 10 so that the foil will melt and be pressed against the inner surface of the duct 6 by means of the hot gas stream and thus adhere to the inner surface of the duct 6. Preferably the heat laminating means comprises several small orifices to spread the hot gas. In the embodiment shown in FIG. 8 the inner space 7 has a circular cross sectional shape. It is obviously conceivable with other cross sectional shapes, such as hexagonal as shown in FIG. 10.

Figure 9:
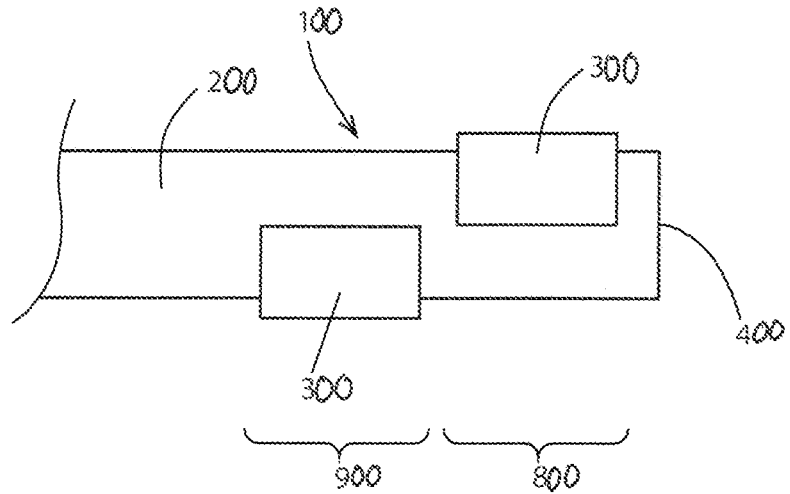
FIG. 9 shows a side view of an embodiment of an axle having heat laminating means arranged thereto.

In FIG. 9 an embodiment of an axle 200 is shown having at least two heat laminating means 300 provided in two following axial positions 800, 900. The first position 800 is the position that first enters into the inner space 7 of a duct 6. It is also possible to have more than two axially spaced heat laminating means 300. This embodiment is especially suitable when the heat laminating means 300 are contact heating blocks 300'. When contact heating blocks 300' are used they must be moved radially outwards to come in contact and preferably also press against the foil 10 so that the foil 10 will adhere to the inner surface of the duct 6.

Figure 10:
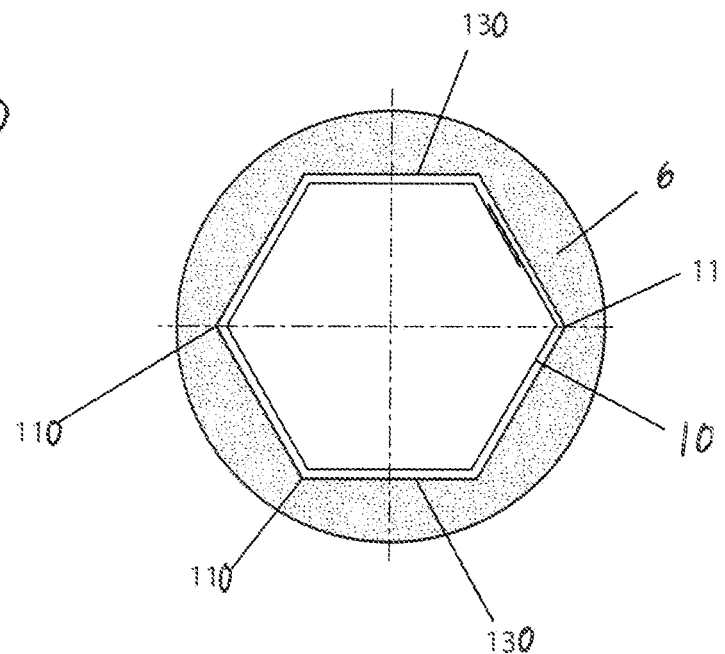
FIG. 10 shows a cross sectional view of a foil arranged in a duct ready for lamination.
Figure 11:
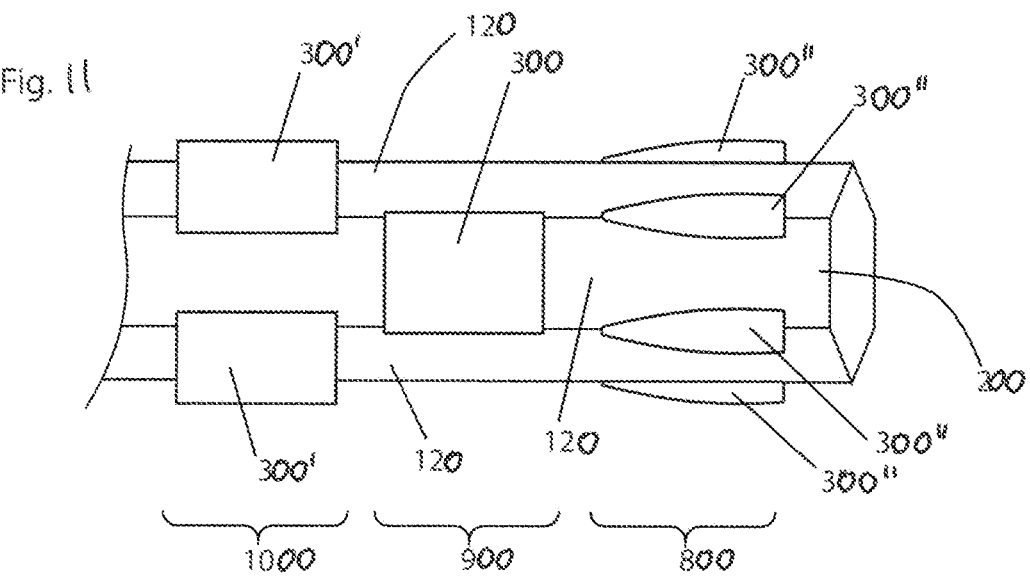
FIG. 11 shows an embodiment of an axle with heat laminating means suitable for heat laminating an inner surface having a hexagonal cross section.

In FIG. 10 another cross sectional shape of the inner space 7 is shown, in this embodiment a hexagonal shape. In FIG. 11 a suitable apparatus 100 for heat laminating a foil 10 to the inner surface of a hexagonal inner space 7 of a duct 6 is shown. An axle 200 is provided having a hexagonal cross sectional shape. Three axial positions 800, 900, 1000 with heat laminating contact blocks 300' are provided.

The first position 800 comprises corner blocks 300" especially designed to press into the corner 110 of the duct 6 and heat up the foil 10 so that the foil 10 will adhere in the corners 110. Then three blocks 300' will follow in the second position 900 during the introduction and movement through the inner space 7 of the duct 6. The three blocks 300' will be arranged on every second side 120 of the axle 200. At last three blocks 300' are arranged on the three last sides 120 at the third position 1000 so that all the corners 110 and all the sides 130 will be heat laminated during the movement of the axle 200 through the inner space 7 of the duct 6.

Figure 12A:
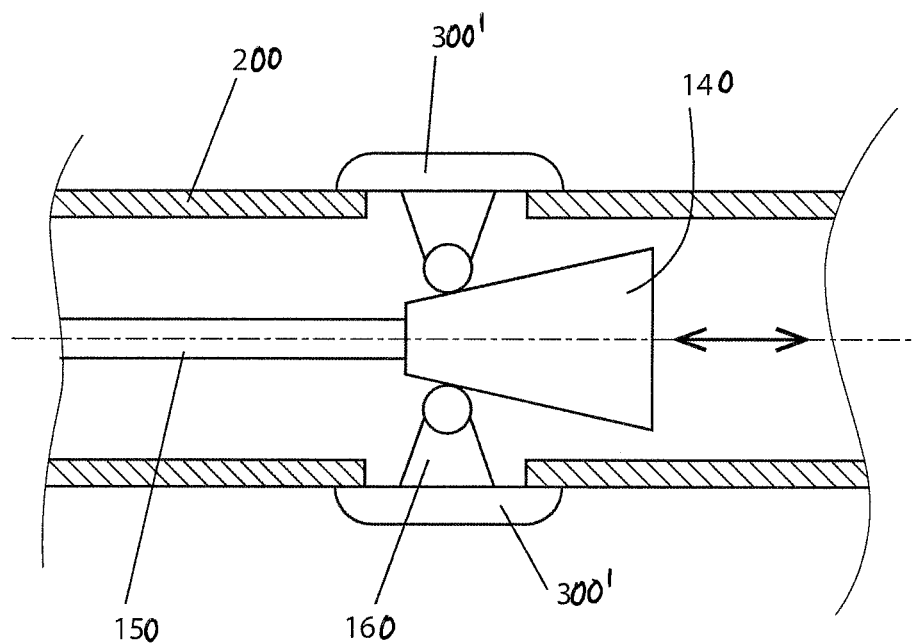
FIGS. 12a and 12b shows an embodiment of controlling the radial position of heat laminating pads.
Figure 12B:
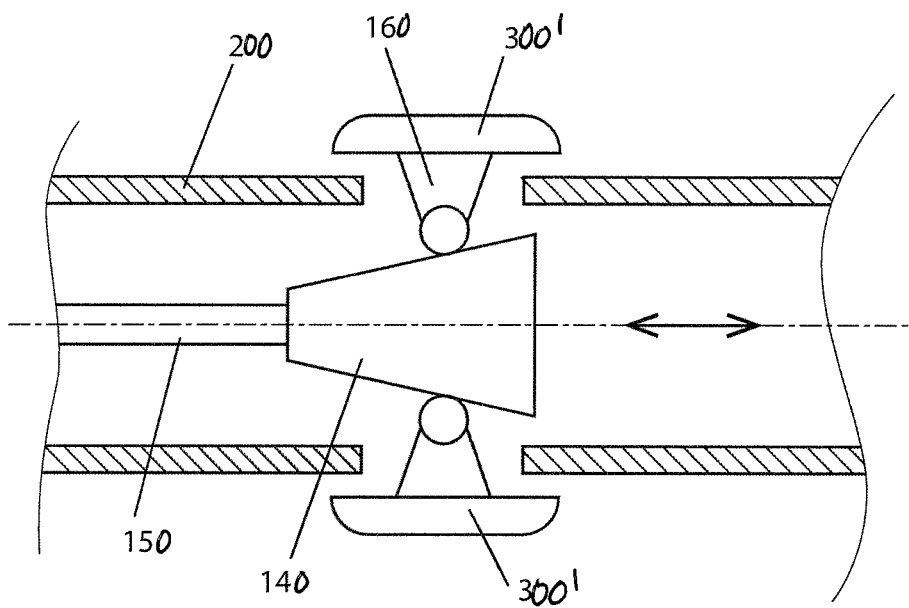

As previously mentioned the contact heating blocks 300 need to be able to move from a closed position along the surface of the axle 200 to a working position radially distanced from the surface of the axle 200, especially if it is contact heating blocks 300'. One way of accomplish this is to let the heating blocks be movable to at least the working position by means of climbing uphill on at least one wedge or conical device 140. An example of that is shown in FIGS. 12a and 12b.

The wedge or conical device 140 is arranged on a rod 150, which is axially movable inside the axle 200. The heating blocks 300' are provided with a device 160 that can slide or roll along the wedge or conical device 140. Preferably the device 160 is provided with a wheel arranged in the rolling direction. If the axle 200 is provided with more than one axial position of heating blocks 300', each axial position 800, 900, 1000 for heating blocks 300' has a wedge or conical device 140 and each has its own rod 150.

The above described embodiments are only examples and shall not be restricting the scope of the invention. The full scope is shown in the appended claims.

The invention claimed is:

1. An apparatus for introducing a foil to be laminated to an inner surface of an elongated duct, the apparatus comprising an axle on which the foil is providable, the axle being movable from a first position outside of the duct, where the foil is provided on the axle, to a second position inside the duct where the foil is in position for lamination to the inner surface of the duct, wherein the foil is in the form of a sheet, and wherein the axle comprises means for regulating a gas, both under pressure and over pressure, and having orifices connected to the regulation means at a surface of the axle, wherein the axle is provided with at least one heat laminating means, the at least one heat laminating means being provided in the vicinity of a first end of the axle, the axle being movable from a first position outside of a first end of the duct through an inner space of the duct to an end position where at least a portion of the axle, the portion having the heat laminating means, is outside of a second end of the duct, the first end of the axle is the end that enters the inner space of the duct during the movement.

2. The apparatus according to claim 1, wherein the axle is provided with means for spreading out the foil against the inner surface of the duct.

3. The apparatus according to claim 1, wherein the means for regulating a gas is set to provide an under pressure along the axle in order to keep the foil in position during the movement of the axle from the first to the second position.

4. The apparatus according to claim 2, wherein the means for spreading out the foil is using the means for regulating a gas to provide an over pressure along the axle in order to spread out the foil in position for lamination when the axle is in the second position.

5. The apparatus according to claim 2, wherein the means for spreading out the foil comprises a mechanism for increasing the circumference of the axle.

6. The apparatus according to claim 1, wherein the axle has a cross sectional shape which corresponds to the cross sectional shape of the inside of the inner space of the duct.

7. The apparatus according to claim 1, wherein the foil which is arrangeable at the axle is in the form of a tube.

8. The apparatus according to claim 7, wherein the axle is provided with at least a gripper provided at each end or along the length of the axle, parallel to the axle, wherein an end of the foil is gripped.

9. The apparatus according to claim 8, wherein the axle is rotatable around its length axis, thus rolling up foil around the periphery of axle.

10. The apparatus according to claim 8, wherein a brush is arranged along the length of the axle, the brush being movable against the periphery of the axle during the rolling up of foil on the axle.

11. The apparatus according to claim 7, wherein a cutter is movable from one end of the axle to the other end cutting the foil parallel to the length axis, thus detaching a piece of foil rolled up on the axle from a supply roll.

12. The apparatus according to claim 1, wherein heat laminating means is/are provided at least at the end of the axle which is first introduced into the inner space of the duct.

13. The apparatus according to claim 12, wherein the heat laminating means are arranged along the full length of the axle.

14. The apparatus according to claim 12, wherein the axle is movable out of the inner space of the duct and at the same time the heat laminating means are active.

15. The apparatus according to claim 12, wherein the heat laminating means uses hot gas at over pressure.

16. The apparatus according to claim 12, wherein the heat laminating means are contact heating pads.

17. The apparatus according to claim 1, wherein the foil is positioned in the inner space along the inner surface of the duct ready for lamination.

18. The apparatus according to claim 1, wherein the heat laminating means is provided for exhausting hot gas against an inner side of the foil so that an outer side of the foil will at least partly melt and adhere to the inner surface of the duct.

19. The apparatus according to claim 1, wherein the heat laminating means are at least two heating blocks provided for sliding contact along an inner side of the foil so that the foil will partly melt and adhere to the inner surface of the duct.

20. The apparatus according to claim 19, wherein a shape of an outer surface of the beating blocks corresponds to a shape of the inner surface of the duct.

21. The apparatus according to claim 19, wherein the heating blocks are arranged in at least two axial places along the axle, thus the at least one heating block of the second place will follow the at least one heating block of the first place during movement of the axle through the inner space of the duct.

22. The apparatus according to claim 19, wherein the heating blocks are positionable in at least a closed position close to the axle and a working position on a radial distance from the axle.

23. The apparatus according to claim 19, wherein at least some of the heating blocks are positionable in an intermediate position during the initial lamination.

24. The apparatus according to claim 22, wherein the heating blocks are kept in the closed position by means of at least one retaining spring.

25. The apparatus according to claim 19, wherein the heating blocks are movable to at least the working position by means of climbing towards the broad end on at least one wedge or conical device.

26. The apparatus according to claim 25, wherein the at least one wedge or conical device is arranged on a respective rod, which is axially movable inside the axle.

27. The apparatus according to claim 26, wherein each axial place for heating blocks has a wedge or conical device and its rod.

28. The apparatus according to claim 19, wherein heating blocks corresponding to corners of the cross sectional shape of the inner space of the duct, such as hexagonal, are arranged at the first axial place.

29. A method for introducing a foil to be laminated to an inner surface of an elongated duct, comprising the steps:
   rolling off the foil supply roll,
   cutting off a sheet of foil,
   arranging a foil to an axle when the axle is in a first position outside of the duct,
   introducing the axle and the foil into the inner space of the duct by moving the axle into a second position inside the duct, where the foil is in position for lamination to the inner surface of the duct,
   sucking the foil to the axle by means of under pressure during the step of introducing the axle into the inner space of the duct, and
   laminating the foil to the inner surface of the duet by means of heat.

30. The method according to claim 29, comprising the step of spreading out the foil along the inner surface of the duct so that the foil is in contact with the inner surface.

31. The method according to claim 29, comprising the step of gripping an end portion of the toil with at least a gripper provided at each end or lengthwise at the axle, unrolling foil from a supply roll, rolling up the foil on the axle, by rotating the axle, and cutting off the rolled up foil from the supply roll.

32. The method according to claim 29, comprising a method for laminating a foil to an inner surface of an elongated duct, comprising the steps of
   introducing an axle haying heat laminating means at a first, a leading, end of the axle at a first end of the duct into an inner space of the duct,
   heat laminating along the inner space of the duct while the axle moves axially through the inner space of the duct until at least a portion of the axle having the heat laminating means protrudes outside of the inner space at a second end of the duct, and
   withdrawing the axle through the laminated inner space of the duct to the outside of the first end of the duct.

33. The method according to claim 32, comprising the step of raising the heat laminating means in the form of at least two heating blocks radially so that they will come in contact with the foil arranged along the inner surface of the duct during the movement of the axle from the first end to the second end of duct.

\* \* \* \* \*